US012630119B2

(12) United States Patent
Yang

(10) Patent No.: US 12,630,119 B2
(45) Date of Patent: May 19, 2026

(54) SENSOR CLEANING SYSTEM AND FUEL CELL VEHICLE INCLUDING THE SAME

(71) Applicants: HYUNDAI MOTOR COMPANY, Seoul (KR); KIA CORPORATION, Seoul (KR)

(72) Inventor: Young Dug Yang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 106 days.

(21) Appl. No.: 18/921,561

(22) Filed: Oct. 21, 2024

(65) Prior Publication Data

US 2025/0326376 A1 Oct. 23, 2025

(30) Foreign Application Priority Data

Apr. 22, 2024 (KR) ........................ 10-2024-0053289

(51) Int. Cl.
| | |
|---|---|
| *B60S 1/52* | (2006.01) |
| *B60S 1/50* | (2006.01) |
| *B60S 1/54* | (2006.01) |
| *G01S 7/40* | (2006.01) |
| *H01M 8/04111* | (2016.01) |

(52) U.S. Cl.
CPC . *B60S 1/52* (2013.01); *B60S 1/50* (2013.01); *B60S 1/54* (2013.01); *G01S 7/4043* (2021.05); *H01M 8/04111* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 12,366,468 B2* | 7/2025 | Yang ..................... | G01S 7/4043 |
| 2021/0013527 A1* | 1/2021 | You ................... | H01M 8/04388 |

FOREIGN PATENT DOCUMENTS

| | | |
|---|---|---|
| KR | 2018-0033475 A | 4/2018 |
| KR | 2024-0045514 A | 4/2024 |

* cited by examiner

*Primary Examiner* — Rita P Adhlakha
(74) *Attorney, Agent, or Firm* — MCDONNELL BOEHNEN HULBERT & BERGHOFF LLP

(57) ABSTRACT

A hydrogen vehicle includes a depressurizing regulator configured to reduce the pressure of hydrogen introduced therein, a push bar connected to the depressurizing regulator and configured to reciprocate during the depressurizing process of the depressurizing regulator, a compression device configured to generate a compressed fluid by being operated by the reciprocating motion of the push bar, and a sensor cleaning system configured to receive the compressed fluid and spray the compressed fluid to an environment sensor.

15 Claims, 7 Drawing Sheets

FIG. 1
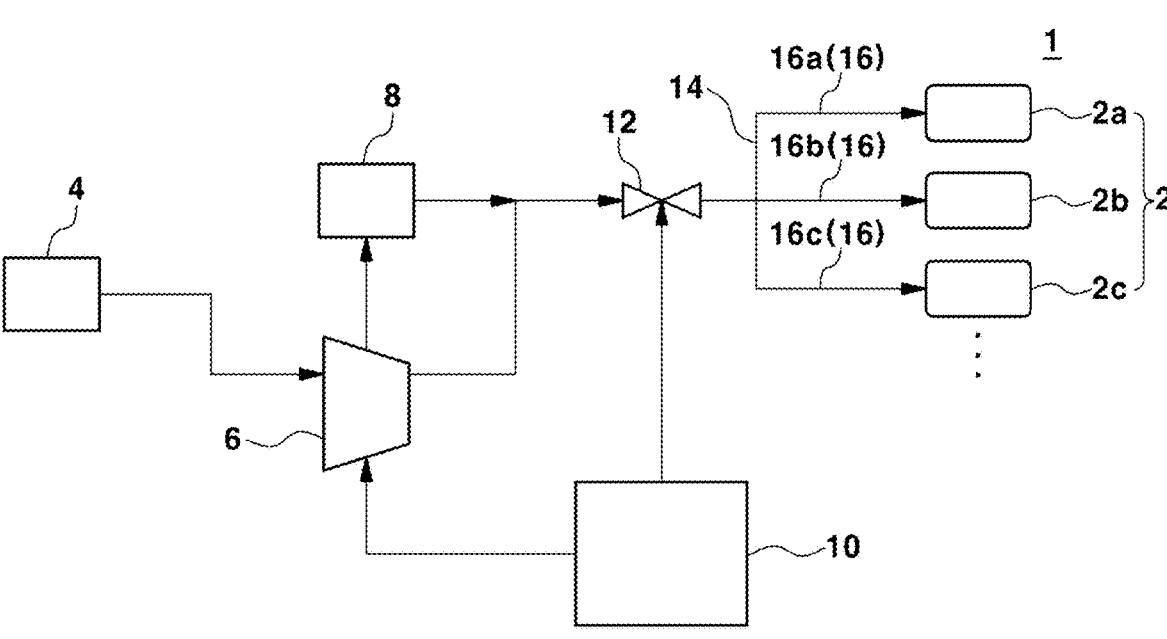
FIG. 2 ("Prior Art")
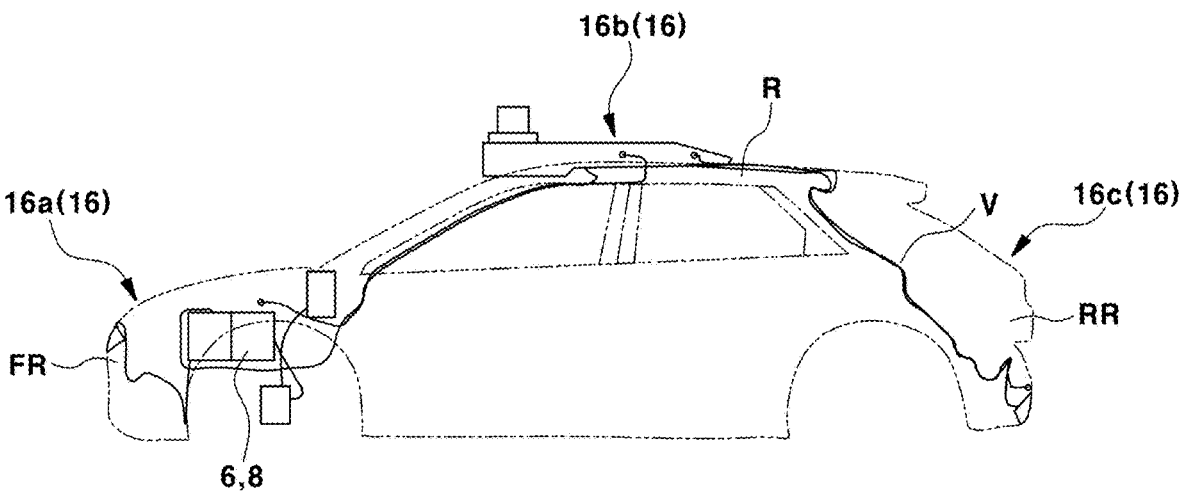

SENSOR CLEANING SYSTEM AND FUEL CELL VEHICLE INCLUDING THE SAME

CROSS REFERENCE TO RELATED APPLICATIONS

This application claims, under 35 U.S.C. § 119(a), the benefit of and priority to Korean Patent Application No. 10-2024-0053289, filed on Apr. 22, 2024, the entire contents of which are incorporated herein by reference.

TECHNICAL FIELD

The present disclosure relates to a sensor cleaning system. More particularly, the present disclosure relates to a sensor cleaning system for a hydrogen vehicle.

BACKGROUND

Recently, a driver assistance system for assisting a driver of a vehicle is mounted to the vehicle to ensure safe travelling in various circumstances. In addition to the driver assistance system, research and development has been actively conducted on an autonomous vehicle capable of autonomously travelling without a driver's intervention.

The driver assistance system or the autonomous vehicle is equipped with various types of environment sensors capable of detecting the environment around the vehicle in various ways. Examples of the environment sensor mounted on the vehicle may be a radar, a LiDAR, a camera, etc.

Due to these sensors being mounted on the external side of the vehicle, the sensing parts thereof may be easily contaminated by rainwater, snow, foreign substances, such as dust, and the like. Because the sensors need to be kept clean at a certain level or higher to ensure sensor performance, a sensor cleaning system to clean the sensors when the sensing parts are contaminated is mounted in the vehicle.

The above information disclosed in this Background section is only for enhancement of understanding of the background of the present disclosure, and therefore it may contain information that does not form the prior art that is already known to a person of ordinary skill in the art.

SUMMARY

The present disclosure has been made in an effort to solve the above-described problems associated with the prior art, and an object of the present disclosure is to provide a compression device capable of forming an air curtain on an environment sensor of a hydrogen vehicle.

Another object of the present disclosure is to provide a sensor cleaning system including the compression device.

The object of the present disclosure is not limited to the foregoing, and other objects not mentioned herein will be clearly understood by one having ordinary skill in the art to which the present disclosure pertains based on the description below.

The features of the present disclosure to achieve the object of the present disclosure as described above and to perform the characteristic functions of the present disclosure to be described later are as follows.

In one aspect, the present disclosure provides a hydrogen vehicle including a depressurizing regulator configured to reduce the pressure of hydrogen introduced therein, a push bar connected to the depressurizing regulator and configured to reciprocate during the depressurizing process of the depressurizing regulator, a compression device configured to generate a compressed fluid by being operated by the reciprocating motion of the push bar, and a sensor cleaning system configured to receive the compressed fluid and spray the compressed fluid to an environment sensor.

In another aspect, the present disclosure provides a sensor cleaning system for a hydrogen vehicle using hydrogen as a fuel, the system including a compression device configured to operate by the pressure being discharged during the depressurizing process of the hydrogen, and a nozzle configured to spray the compressed fluid generated by the compression device onto an environment sensor.

Other aspects and preferred embodiments of the present disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is an example configuration view of a sensor cleaning system;

FIG. 2 illustrates a vehicle including a sensor cleaning system;

Figure 3:
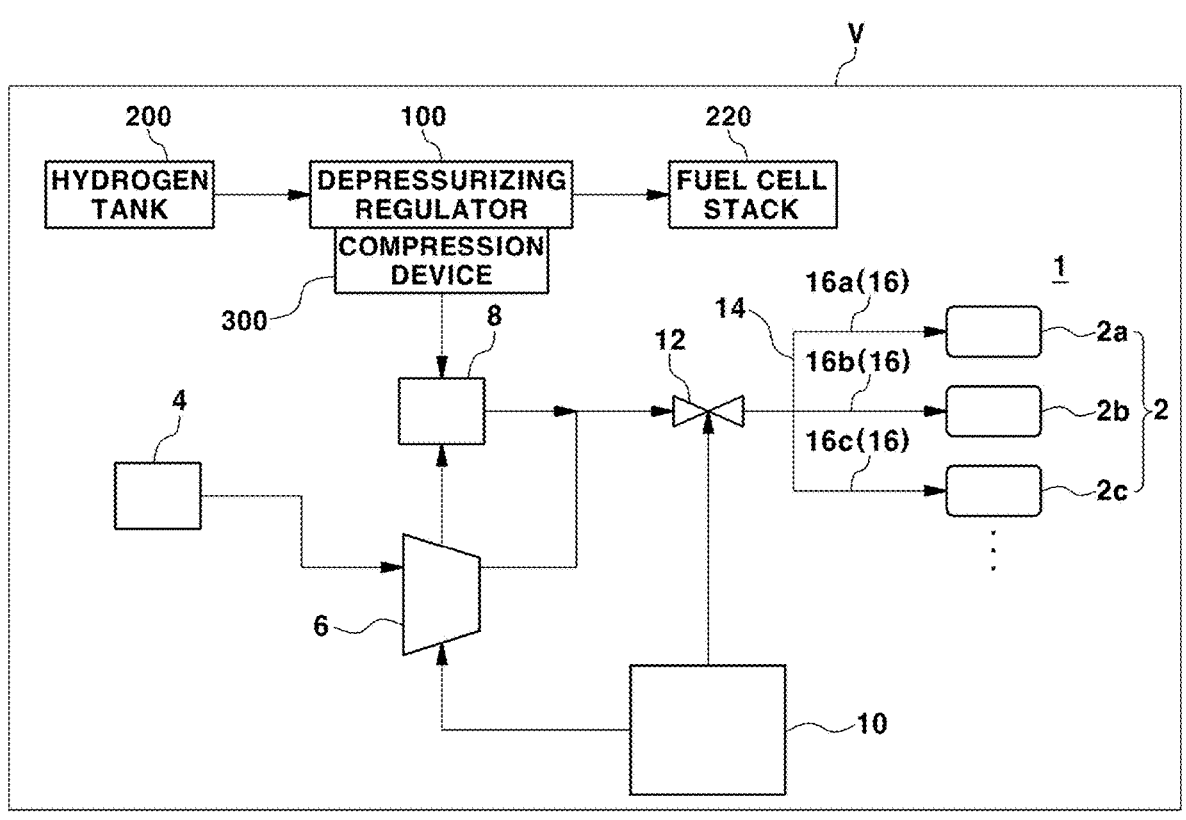
FIG. 3 is a configuration view of a sensor cleaning system according to an embodiment of the present disclosure.

It should be understood that the appended drawings are not necessarily to scale, presenting a somewhat simplified representation of various preferred features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Descriptions of specific structures or functions presented in the embodiments of the present disclosure are merely exemplary for the purpose of explaining the embodiments according to the concept of the present disclosure, and the embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

Meanwhile, in the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It will be understood that, when a component is referred to as being "connected to" or "brought into contact with" another component, the component may be directly connected to or brought into contact with the other component, or intervening components may also be present. In contrast, when a component is referred to as being "directly connected to" or "brought into direct contact with" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements.

Hereinafter, the present disclosure is described in detail with reference to the accompanying drawings.

As described above, so as to maintain performance of an environment sensor configured to detect the environment around a vehicle, the surface of the environment sensor needs to be periodically cleaned. For example, the environment sensor may be tainted by solids, such as dust and sand, and may be stained by liquids, such as raindrops and snow during precipitation.

Particularly, in an active autonomous vehicle, the vehicle travels based on information on the surrounding environment, such as traffic lights, pedestrians, road types, buildings, and surrounding vehicles, recognized by environment sensors. When the surface of the environment sensor is contaminated, the environment sensor is unable to recognize the surrounding environment, hindering active autonomous travelling. For this reason, a sensor cleaning system of a vehicle plays an important role of enabling autonomous travelling by helping the environment sensor to clearly recognize the surrounding environment and removing contaminants from the surface of the sensor.

The environment sensor may be cleaned using a washer fluid or high-pressure air. In the former case, the sensor may be cleaned using a washer fluid, and moisture on the sensor may be removed by spraying air. In the latter case, only high-pressure air is used to remove foreign substances from the surface of the sensor. Additionally, there may be a cleaning method that uses a combination of washer fluid and high-pressure air.

Hereinafter, a sensor cleaning system using the method of the latter, so-called air cleaning method, which cleans an environment sensor by spraying compressed air, is described with reference to FIGS. 1 and 2. A sensor cleaning system 1 is configured to clean the environment sensor using compressed air. The sensor cleaning system 1 performs cleaning by spraying compressed air on the surface of an environment sensor 2. The environment sensor 2 may include a sensing device, such as a LiDar, a radar, and a camera, and may be disposed at the front FR, rear RR, sides, roof R, etc. of a vehicle V.

Specifically, air filtered by an air filter 4 provided in the vehicle V is introduced into a compressor 6. Air compressed by the compressor 6 is sprayed on the surface of the environment sensor 2 to remove foreign substances from the surface. The environment sensor 2 includes a plurality of environment sensors 2*a*, 2*b*, 2*c*. Although three environment sensors are described in the drawing and specification, the number of the environment sensors is not limited thereto and may be increased or decreased.

Moreover, the sensor cleaning system 1 includes an air tank 8. Air compressed by the compressor 6 or supplied from an external device may fill the air tank 8, and the air filling the air tank 8 may be used for cleaning the environment sensor 2.

The sensor cleaning system 1 includes a controller 10 configured to operate a valve 12, e.g., a solenoid valve, for each preset period or in a preset situation, such as when the environment sensor 2 detects contamination. Therefore, compressed air may be sprayed from the compressor 6 or from the air tank 8 to the environment sensor 2 to clean the environment sensor 2. The valve 12 may be provided with or integrated with a distributor 14 to distribute compressed air to each of the environment sensors 2 via nozzles 16*a*, 16*b*, 16*c* (collectively, nozzle 16), each for a corresponding one of the plurality of environment sensors 2 as illustrated in FIG. 2. In an example, the compressed air may be a compressed fluid, such as a washer fluid. In this case, the sensor cleaning system 1 may be a washer fluid cleaning system.

When compressed air is continuously sprayed onto the environment sensor 2 while the vehicle V is travelling, the environment sensor 2 may be prevented from being contaminated. In this regard, the applicant of the present disclosure has applied for a patent for the "sensor protection system" (Korean Patent Application No. 10-2022-0124919; filed on Sep. 30, 2022) capable of providing an air curtain on the environment sensor 2. However, because the operation duration of the compressor 6 of the sensor cleaning system 1 is limited, it is impossible to continuously form an air curtain on the environment sensor 2. Therefore, currently, the sensor cleaning system 1 is controlled to perform air cleaning or to form an air curtain only for a predetermined period of time.

In response to these setbacks, the present disclosure provides a compression device and a sensor cleaning system including the same, capable of using the high pressure at a hydrogen tank, the high pressure of hydrogen being discarded from a hydrogen vehicle, in the sensor cleaning system.

As illustrated in FIG. 3, the vehicle V may be a hydrogen vehicle. The hydrogen vehicle is a vehicle that is driven using hydrogen as a fuel. The hydrogen vehicle may be a hydrogen fuel-cell vehicle or a hydrogen engine vehicle. The fuel cell in the hydrogen fuel-cell vehicle may generate an electrical energy through an electrochemical reaction between hydrogen, which is a fuel, and oxygen in the air. The hydrogen engine vehicle may be driven, similar to the existing internal combustion engine vehicle, by explosively burning hydrogen using oxygen.

The hydrogen vehicle V includes a hydrogen tank 200. Pressurized hydrogen is stored in the hydrogen tank 200. Moreover, the vehicle V may include a fuel cell stack 220. The fuel cell stack 220 in the illustrated embodiment may be replaced with a hydrogen engine. However, hereinafter described is a hydrogen vehicle including the fuel cell stack 220. Hydrogen supplied from the hydrogen tank 200 is supplied as a fuel to the fuel cell stack 220, and an electrical energy may be generated through an electrochemical reaction that occurs in the fuel cell stack 220. For example, the generated electrical energy may be supplied to the motor of the vehicle V to drive the vehicle V.

Hydrogen from the hydrogen tank 200 is supplied and sprayed through a hydrogen supply line 210 to the fuel cell stack 220 in the illustrated embodiment or to a hydrogen internal combustion engine. When hydrogen is used in the fuel cell stack 220 or in the hydrogen internal combustion engine, the pressure of hydrogen in a high pressure state of hundreds of bar is reduced to the pressure at an operating environment level (e.g., 16 bar, 36 bar, etc.).

According to an embodiment of the present disclosure, high-pressure hydrogen is depressurized using a depressurizing regulator 100. In other words, when hydrogen is supplied, the pressure of hydrogen is lost in the depressurizing regulator 100 on the hydrogen supply line 210.

According to the present disclosure, the sensor cleaning system 1 may be continuously operated while the vehicle V is travelling by using the pressure of hydrogen being discarded during the hydrogen depressurizing process as a pressure source. As a result, a compressed fluid, such as compressed air or washer fluid, is continuously sprayed onto the environment sensor 2 to form an air curtain.

In some embodiments, a compression device 300, which is operated using the pressure of hydrogen being discarded from the depressurizing regulator 100, may allow a compressed fluid to fill the air tank 8. In this embodiment, in addition to the compressed fluid generated by the compressor 6 of the sensor cleaning system 1, the compressed fluid generated by the compression device 300 may be supplied to the air tank 8. Accordingly, an air curtain may be continuously formed on the environment sensor 2 through the sensor cleaning system 1 without constraints in operating the compressor 6.

Figure 4:
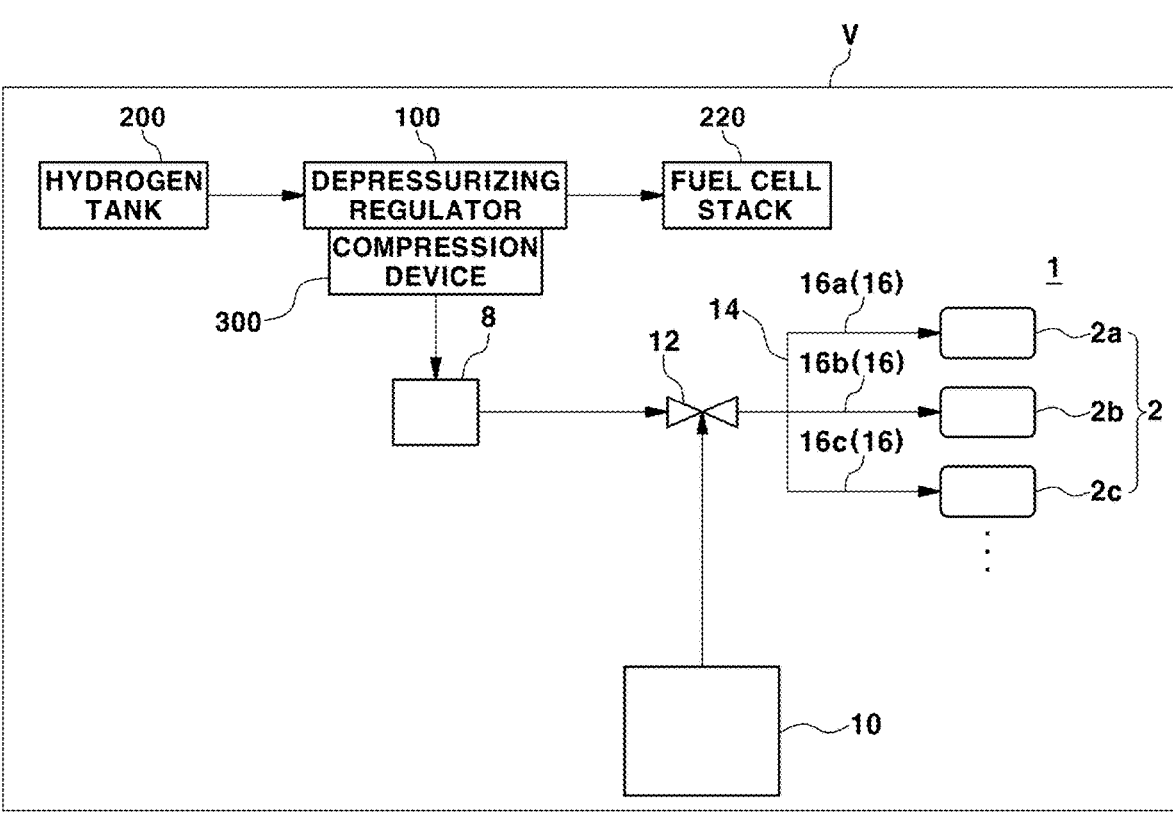
FIG. 4 is a configuration view of a sensor cleaning system according to a different embodiment of the present disclosure.

In some embodiments, as illustrated in FIG. 4, the sensor cleaning system 1 according to the present disclosure may not include the compressor 6. In this case, a compressed fluid for the sensor cleaning system 1 may be generated only by the compression device 300.

The sensor cleaning system 1 according to the present disclosure includes the compression device 300 for directing the pressure of hydrogen being discarded from the depressurizing regulator 100 to the sensor cleaning system 1. In an example, the compression device 300 may be operatively connected to the depressurizing regulator 100.

Figure 5:
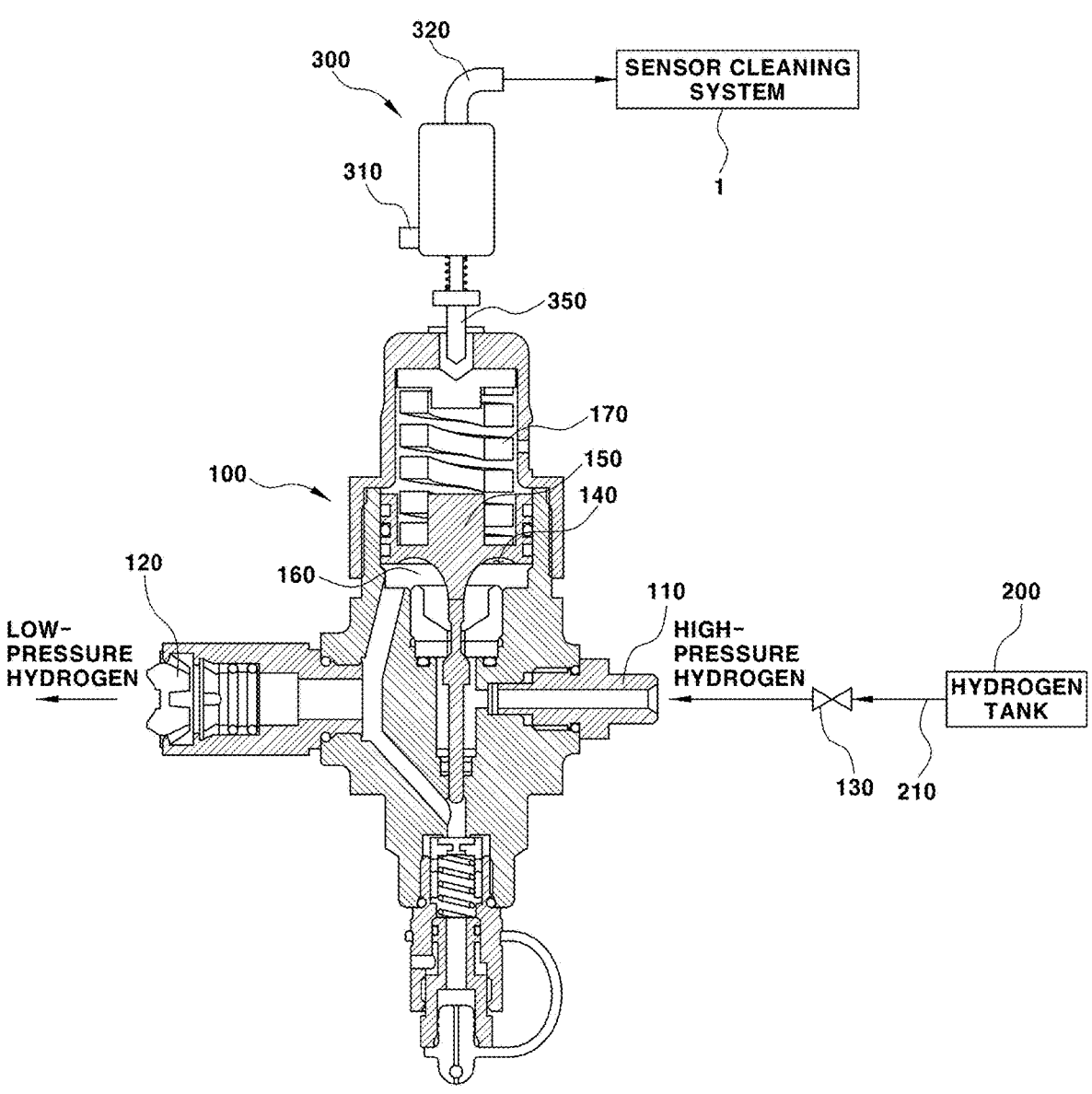
FIG. 5 illustrates a depressurizing regulator and a compression device according to an embodiment of the present disclosure.
Figure 6:
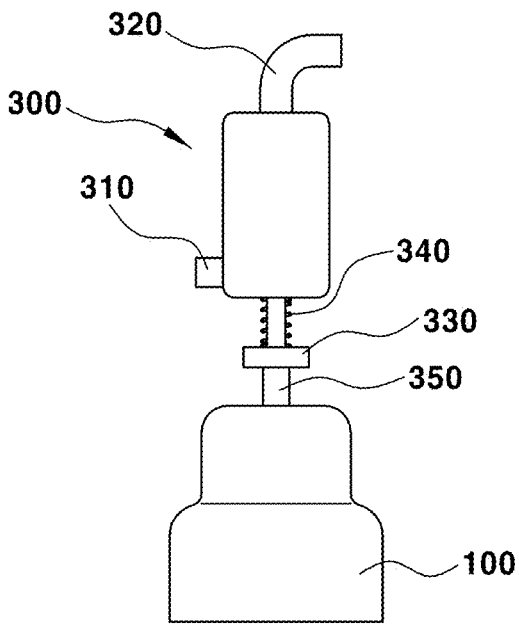
FIG. 6 illustrates a compression device according to an embodiment of the present disclosure.

Referring to FIGS. 5 and 6, the compression device 300 may be operated by the pressure wasted in the depressurizing regulator 100.

The compression device 300 includes a fluid inlet 310 and a fluid outlet 320. A fluid, such as air or washer fluid, may flow in through the fluid inlet 310, and a compressed fluid may be discharged through the fluid outlet 320. The position and shape of the fluid inlet 310 or the fluid outlet 320 are not limited to the illustrated embodiment but may be varied.

According to an embodiment of the present disclosure, the compression device 300 may include a piston 330 and a spring 340 to compress the fluid flowing in through the fluid inlet 310. The piston 330 may reciprocate.

The piston 330 may reciprocate by being connected to a push bar 350. The spring 340 is mounted to the piston 330. When the piston 330 is pressed, the spring 340 is compressed, and when the pressing force on the piston 330 is released, the spring 340 may return to its original position. As the stroke of the piston 330 is repeated, the compression device 300 may generate a compressed fluid.

The depressurizing regulator 100 may compress or decompress the piston 330 of the compression device 300. In one embodiment, the depressurizing regulator 100 may compress or decompress the piston 330 using the push bar 350. The push bar 350 may be moved by the hydrogen being discharged out of the depressurizing regulator 100 while the pressure of the hydrogen is regulated by the depressurizing regulator 100.

Specifically, the depressurizing regulator 100 includes a hydrogen inlet 110 and a hydrogen outlet 120. The hydrogen inlet 110 is connected to the hydrogen tank 200 via the hydrogen supply line 210 and is configured to receive high-pressure hydrogen from the hydrogen tank 200. The hydrogen outlet 120 is configured to discharge hydrogen depressurized by the depressurizing regulator 100. The depressurized hydrogen may be directed to the fuel cell stack 220 or to a hydrogen engine.

An openable or closable valve 130 is disposed in the hydrogen supply line 210. By the operation of the valve 130, the flow of the hydrogen introduced into the depressurizing regulator 100 may be allowed or blocked.

The high-pressure hydrogen introduced into the depressurizing regulator 100 through the hydrogen inlet 110 has a portion discharged through the hydrogen outlet 120 at a set low pressure. The set pressure at the depressurizing regulator 100 may be changed by a known method. The other portion of the high-pressure hydrogen introduced into the depressurizing regulator 100 is introduced into a chamber 140. The chamber 140 is defined by a diaphragm 150 and a wall body 160. The pressure formed within the chamber 140 is applied to the diaphragm 150, and by which a pressure regulation spring 170 connected to the diaphragm 150 may be compressed. In other words, when the valve 130 is opened and high-pressure hydrogen flows in through the hydrogen inlet 110, the pressure regulation spring 170 is compressed to convert the high-pressure hydrogen into low-pressure hydrogen. Conversely, when the hydrogen inlet 110 is closed, the pressure regulation spring 170 returns to the original position thereof.

The push bar 350 connects the depressurizing regulator 100 to the compression device 300. The push bar 350 is connected to an end portion of the pressure regulation spring 170, and may thereby move together with the pressure regulation spring 170 when the pressure regulation spring 170 is stretched or compressed.

Using the push bar 350, the compression device 300 may generate a compressed fluid by the operation of the depressurizing regulator 100. In an illustrated embodiment, the compression device 300 may generate a compressed fluid by the ascending and descending motion of the push bar 350.

Figure 7:
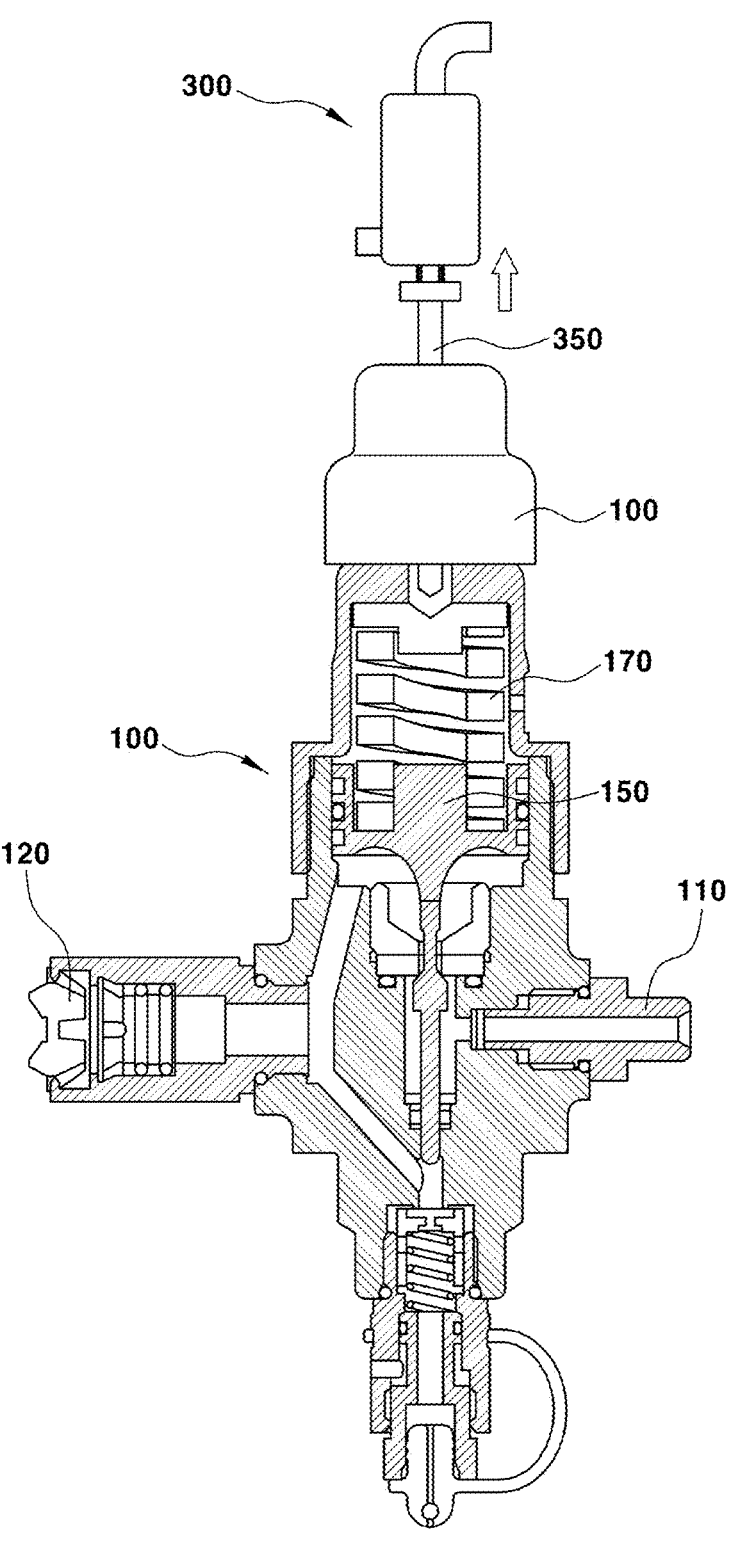
FIGS. 7 and 8 illustrate the operation process of the compression device in FIG. 5.
Figure 8:
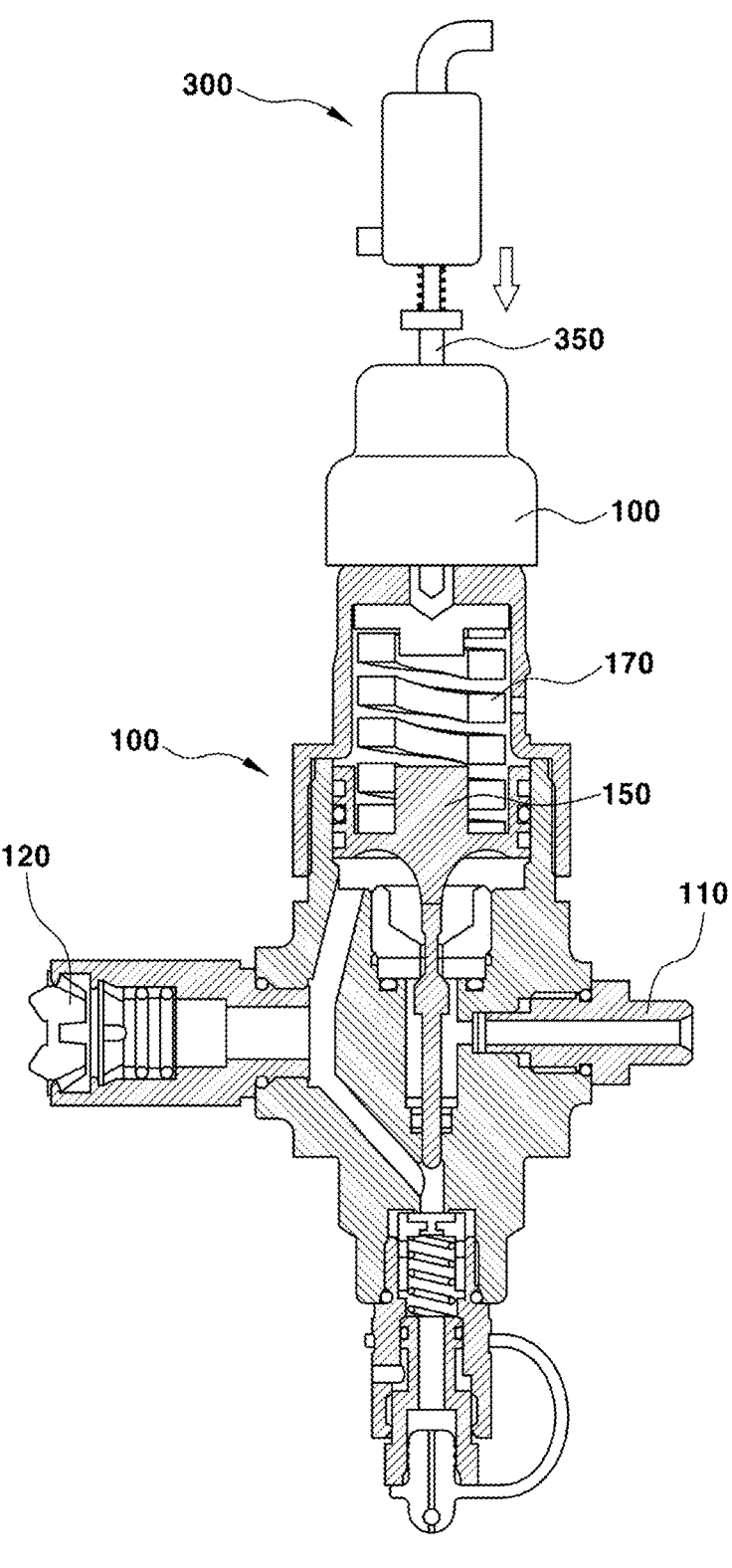

As illustrated in FIG. 7, when the push bar 350 ascends, the piston 330 is pressed and the spring 340 is compressed. Conversely, as illustrated in FIG. 8, when the push bar 350 descends, the pressing force caused by the piston 330 is released to allow the spring 340 to return to the original position thereof. As the stroke of the piston 330 is repeated, a compressed fluid is generated by the compression device 300. The compressed fluid may be directed to the sensor cleaning system 1 through the fluid outlet 320.

According to an embodiment of the present disclosure, the compression device 300 may be connected to the sensor cleaning system 1. For example, the compressed fluid generated by the compression device 300 may fill the air tank 8 through the air filter 4. Selectively, in one example, the sensor cleaning system 1 may not include the compressor 6.

With this structure, compressed air may be continuously sprayed onto the environment sensor 2 of the sensor cleaning system 1 while the vehicle V is traveling. In other words, the compression device 300 may perform cleaning of the environment sensor 2 and a high-pressure air curtain may be formed on the environment sensor 2 at all times. In the case where the compressed fluid generated by the compression device 300 is a washer fluid, the fluid may be sprayed only when necessary, instead of forming an air curtain.

According to the present disclosure, because high-pressure hydrogen being discarded from the hydrogen vehicle is used to operate the piston of the compression device whereby not needing to separately supply energy, high-pressure air curtain cleaning or high-pressure air cleaning and/or washer fluid cleaning may be performed at all times.

According to the present disclosure, air cleaning and/or washer fluid cleaning is continuously performed, thereby completely preventing contamination on the environment sensor without constraints in operating the compressor even in any bad weather. Ultimately, the marketability of the autonomous vehicle may be maximized.

Moreover, according to the present disclosure, the compressor of the sensor cleaning system may operate without power supply, improving vehicle fuel efficiency.

Furthermore, according to the present disclosure, the compressor to be provided for the sensor cleaning system and/or the compressor for washer fluid cleaning may be eliminated, greatly reducing cost and weight.

As is apparent from the above description, the present disclosure provides the following effects.

According to the present disclosure, provided is a compression device capable of forming an air curtain on the environment sensor of a hydrogen vehicle at all times, keeping the environment sensor always clean.

The present disclosure provides a sensor cleaning system including the compression device.

By including the sensor cleaning system, the weight and cost of the hydrogen vehicle may be reduced.

Effects of the present disclosure are not limited to what has been described above, and other effects not mentioned herein will be clearly recognized by those skilled in the art based on the above description.

It will be apparent to those of ordinary skill in the art to which the present disclosure pertains that the present disclosure described above is not limited by the above-described embodiments and the accompanying drawings, and various substitutions, modifications and changes are possible within a range that does not depart from the technical idea of the present disclosure.

The invention claimed is:

1. A hydrogen vehicle comprising:
a depressurizing regulator configured to reduce a pressure of hydrogen introduced within the regulator;
a push bar connected to the depressurizing regulator and configured to reciprocate during a depressurizing process of the depressurizing regulator;

a compression device configured to generate a compressed fluid by being operated by a reciprocating motion of the push bar; and
a sensor cleaning system configured to receive the compressed fluid and spray the compressed fluid to an environment sensor.

2. The hydrogen vehicle of claim 1, wherein the compression device comprises:
a piston connected to the push bar and configured to reciprocate together with the push bar; and
a spring mounted to the piston and configured to be stretched or compressed by a reciprocating motion of the piston.

3. The hydrogen vehicle of claim 2, wherein the compression device comprises:
a fluid inlet configured to allow a first fluid to be introduced into the compression device; and
a fluid outlet configured to discharge the compressed fluid compressed by the compression device.

4. The hydrogen vehicle of claim 1, wherein the depressurizing regulator comprises:
a hydrogen inlet through which the hydrogen flows into;
a hydrogen outlet configured to discharge hydrogen depressurized by the depressurizing regulator;
a chamber defined within the depressurizing regulator, wherein a first portion of the hydrogen, flowing in through the hydrogen inlet, is introduced into the chamber;
a diaphragm disposed within the chamber and movable by the first portion of the hydrogen being introduced into the chamber; and
a stretchable or compressible pressure regulation spring, connected to the diaphragm, wherein the push bar is connected to the pressure regulation spring.

5. The hydrogen vehicle of claim 1, further comprising:
a hydrogen tank configured to store hydrogen; and
a fuel cell stack or hydrogen engine, wherein hydrogen is supplied from the hydrogen tank via a hydrogen supply line to the fuel cell stack or the hydrogen engine;
wherein the depressurizing regulator is disposed on the hydrogen supply line.

6. The hydrogen vehicle of claim 1, wherein the sensor cleaning system comprises:
a tank capable of being filled with the compressed fluid; and
a compressor configured to compress a second fluid to supply the second fluid to the tank.

7. The hydrogen vehicle of claim 6, wherein the sensor cleaning system does not comprise the compressor.

8. The hydrogen vehicle of claim 1, wherein the compressed fluid is compressed air or washer fluid.

9. The hydrogen vehicle of claim 1, wherein the environment sensor is a radar, a LiDAR, or a camera.

10. A sensor cleaning system for a hydrogen vehicle using hydrogen as a fuel, the system comprising:
a compression device configured to operate by a pressure being discharged during a depressurizing process of the hydrogen; and
a nozzle configured to spray a compressed fluid generated by the compression device onto an environment sensor.

11. The system of claim 10, wherein the depressurizing process of the hydrogen is performed by a depressurizing regulator disposed on a hydrogen supply line.

12. The system of claim 11, further comprising:
a push bar connected to the depressurizing regulator and configured to reciprocate during the depressurizing process;

wherein the compression device is configured to generate the compressed fluid by being operated by a reciprocating motion of the push bar.

13. The system of claim 12, wherein the compression device comprises:

a piston connected to the push bar and configured to reciprocate together with the push bar; and a spring mounted to the piston and configured to be stretched or compressed by a reciprocating motion of the piston.

14. The system of claim 12, wherein the depressurizing regulator comprises:

a hydrogen inlet, wherein the hydrogen flows in through the hydrogen inlet;

a hydrogen outlet configured to discharge hydrogen depressurized by the depressurizing regulator;

a chamber defined within the depressurizing regulator, wherein a first portion of the hydrogen, flowing in through the hydrogen inlet, is introduced into the chamber;

a diaphragm disposed within the chamber and movable by the first portion of the hydrogen being introduced into the chamber; and a stretchable or compressible pressure regulation spring, connected to the diaphragm, wherein the push bar is connected to the pressure regulation spring.

15. The system of claim 10, wherein the hydrogen vehicle comprises a fuel cell stack or a hydrogen engine.

* * * * *